United States Patent [19]

Honma

[11] Patent Number: 4,926,987
[45] Date of Patent: May 22, 1990

[54] ONE-WAY TRANSMISSION DEVICE

[75] Inventor: Mikio Honma, Yokohama, Japan

[73] Assignee: Ohi Seisakusho Co., Ltd., Yokohama, Japan

[21] Appl. No.: 261,153

[22] Filed: Oct. 24, 1988

[30] Foreign Application Priority Data

Jan. 13, 1987 [JP] Japan .................................. 63-3870
Oct. 28, 1987 [JP] Japan ............................... 62-270295

[51] Int. Cl.$^5$ ............................................. F16D 51/04
[52] U.S. Cl. .................................................. 192/8 C
[58] Field of Search .......... 192/8 C, 17 D, 15, 12 BA

[56] References Cited

U.S. PATENT DOCUMENTS 1,997,646 4/1935 Miller .................................. 192/8 C
4,614,257 9/1986 Harada et al. ....................... 192/8 C
4,651,854 3/1987 Harada ................................ 192/8 C
4,778,138 10/1988 Yamada ........................... 192/8 C X

FOREIGN PATENT DOCUMENTS 58-152944 9/1983 Japan .
0080530 5/1984 Japan ................................. 192/8 C

Primary Examiner—Rodney H. Bonck

Attorney, Agent, or Firm—Foley & Lardner, Schwartz, Jeffery, Schwaab, Mack, Blumenthal & Evans

[57] ABSTRACT

Disclosed herein is a one-way transmission device, which comprises a housing having a cylindrical inner wall formed therein; a first coil spring coaxially received in the housing and resiliently pressed at its outer periphery against the cylindrical inner wall, the first coil spring having first and second ends which are bent radially inwardly; a second coil spring coaxially received in the housing beside the first coil spring, the second coil spring being pressed at its outer periphery against the cylindrical inner wall, the second coil spring having first and second ends which are bent radially inwardly; an annular core coaxially and rotatably received in the coaxially arranged first and second coil springs and having at a peripheral portion thereof a sectoral recess into which the first and second ends of the first and second coil springs are received, the sectoral recess being defined by circularly spaced first and second walls; input and output shafts respectively connected to axially opposed sides of the annular core to rotate therewith; and an output member including a base portion having a bore through which the output shaft passes and a pawl projecting into the sectoral recess, the pawl having a slit with which the first end of the first coil spring is engaged.

9 Claims, 6 Drawing Sheets

ONE-WAY TRANSMISSION DEVICE

BACKGROUND OF THE INVENTION

1. Field of the Invention

The present invention relates in general to transmission devices, and more particularly to one-way transmission devices which allow only a transmission of rotation from an input member to an output member. More specifically, the present invention is concerned with one-way transmission devices of a type which uses coil springs for producing a braking force by which the rotation transmission from the output member to the input member is suppressed.

2. Description of the Prior Art

One-way transmission devices of the above-mentioned type have been employed in various parts of a motor vehicle, for example, a door window control mechanism, a seat height position adjuster and the like. That is, once the position of the window pane or the seat is adjusted by manipulating the mechanism or the adjuster, lowering of them due to their own weight is suppressed by a braking force produced in the one-way transmission device.

One of the one-way transmission devices is disclosed in Japanese Patent First Provisional Publication No. 58-152944, which uses one or two torsion springs as means for producing the braking force.

However, due to its inherent construction, the disclosed device has the drawback that a considerable play is produced in not only the output member but also the input member during operation thereof. Furthermore, the spring or springs employed therein fail to produce a satisfied braking force.

SUMMARY OF THE INVENTION

It is therefore an object of the present invention to provide a one-way transmission device which is free of the above-mentioned drawbacks.

According to the present invention, there is provided a one-way transmission device, which comprises a housing having a cylindrical inner wall formed therein; a first coil spring coaxially received in the housing and resiliently pressed at its outer periphery against the cylindrical inner wall, the first coil spring having first and second ends which are bent radially inwardly; a second coil spring coaxially received in the housing beside the first coil spring, the second coil spring being pressed at its outer periphery against the cylindrical inner wall, the second coil spring having first and second ends which are bent radially inwardly; an annular core coaxially and rotatably received in the coaxially arranged first and second coil springs and having at a peripheral portion thereof a sectoral recess into which the first and second ends of the first and second coil springs are received, the sectoral recess being defined by circularly spaced first and second walls; input and output shafts respectively connected to axially opposed sides of the annular core to rotate therewith; and an output member including a base portion having a bore through which the output shaft passes and a pawl projecting into the sectoral recess, the pawl having a slit with which the first end of the first coil spring is engaged.

BRIEF DESCRIPTION OF THE DRAWINGS

The present invention will become apparent from the following description when taken in conjuction with the accompanying drawings, in which.

DETAILED DESCRIPTION OF THE INVENTION

Figure 1:
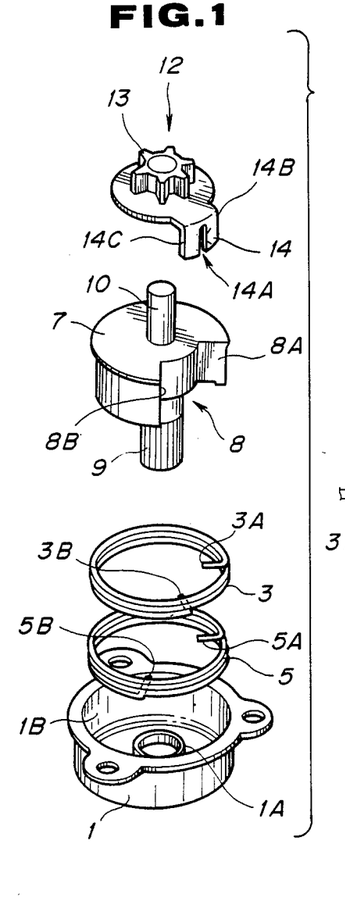
FIG. 1 is an exploded view of a one-way transmission device of a first embodiment of the present invention.
Figure 2:
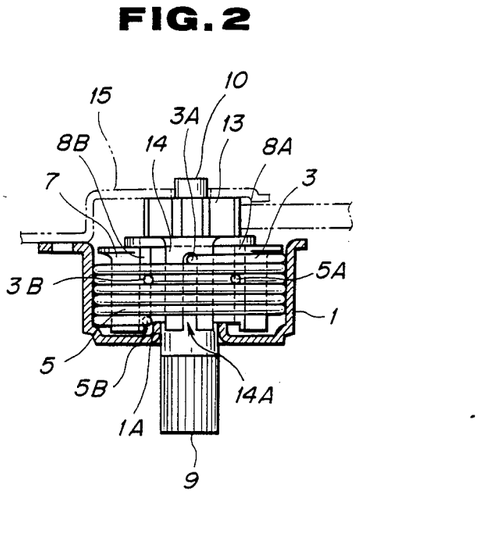
FIG. 2 is a vertically sectional view of the device of the first embodiment in an assembled condition.

Referring to FIGS. 1 and 2, there is shown a one-way transmission device of a first embodiment of the present invention.

The device comprises a cup-shaped housing 1 which has at its bottom center a bearing boss 1A. First and second coil springs 3 and 5 are received in the housing 1 in a manner to be resiliently pressed at their outer peripheries against a cylindrical inner wall 1B of the housing 1. As is seen from FIG. 1, each spring 3 or 5 has both ends 3A and 3B or 5A and 5B bent inwardly.

Designated by numeral 7 is an annular core which has at a peripheral portion a sectoral recess 8 defined by circularly spaced first and second walls 8A and 8B. The core 7 has at one side a serrated input shaft 9 integral therewith and at the other side an output shaft 10 integral therewith. As is seen from FIG. 2, the core 7 spacedly mounts thereabout the coil springs 3 and 5 and is coaxially and rotatably received in the housing 1 having the serrated input shaft 9 projected outward through the bearing boss 1A. Although not shown, when the device is practically used, a knob is detachably connected to the input shaft 9 to manually operate the same. The inwardly bent ends 3A, 3B, 5A and 5B of the two coil springs 3 and 5 are received in the sectoral recess 8.

Designated by numeral 12 is an output member which comprises an annular base member (no numeral), a pinion 13 coaxially connected to the base member and a bent pawl 14 formed on a peripheral edge of the base member. The base member and the pinion 13 have a common bore (no numeral). The pawl 14 is formed with a slit 14A. Side walls of the pawl 14 are designated by numerals 14B and 14C. As is understood from FIG. 2, the output member 12 is disposed on the core 7 in such a manner that the common bore thereof rotatably receives the output shaft 10 and the pawl 14 is spacedly received in the sectoral recess 8. One bent end 3A of the first spring 3 is engaged with the slit 14A of the pawl 14.

Figure 3A:
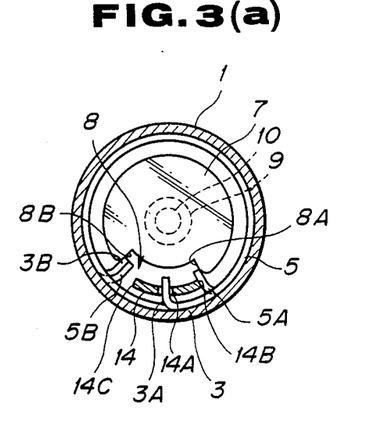
FIGS. 3a, 3b, 3c and 3d are horizontally sectional views of the device of the first embodiment, showing various conditions assumed by the device.
Figure 3B:
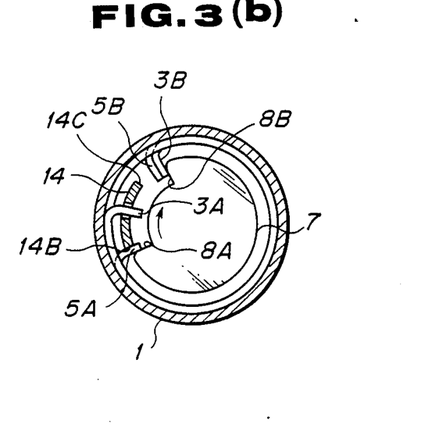
Figure 3C:
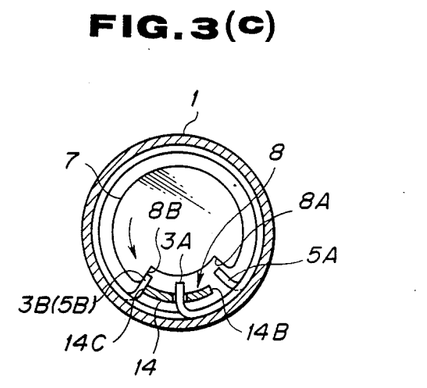
Figure 3D:
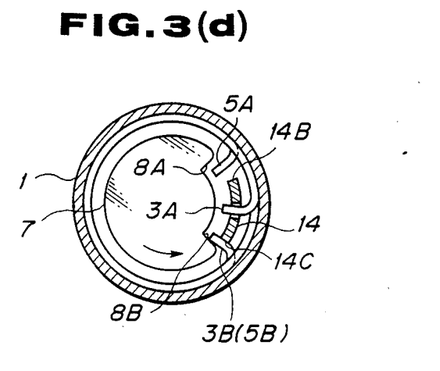

As will be understood from FIGS. 2 and 3a, when the device is in its rest position, the other bent end 3B of the first coil spring 3 is in contact with the wall 8B of the sectoral recess 8 of the core 7. Furthermore, under this rest condition, one bent end 5A of the second coil spring 5 is sandwiched between one side 14B of the pawl 14 and the wall 8A of the recess 8 and the other bent end 5B of the same is spacedly located in a space defined between the other side 14A of the pawl 14 and the other wall 8B of the recess 8.

As will be understood from FIG. 2, the output shaft 10 of the core 7 is rotatably held by a cover 15 which is secured to the housing 1.

In the following, operation of the device of the first embodiment will be described with reference to FIGS. 3a to 3d.

For ease of understanding, the description will be commenced with respect to the rest condition of the device as shown in FIG. 3a. Under this condition, the first and second coil springs 3 and 5 are resiliently pressed at their outer peripheries against the inner cylindrical wall of the housing 1 producing a considerable braking force therebetween, so that movement or rotation of the first and second coil springs 3 and 5 relative to the housing 1 is not permitted by a force which is smaller than a certain degree. As is described hereinabove, under this rest condition, the bent end 5A of the second coil spring 5 is in contact with the wall 8A of the recess 8 of the core 7, and the bent end 3B of the first coil spring 3 is in contact with the other wall 8B of the recess 8. Thus, undesirable play of the core 7 relative to the housing 1 is suppressed or at least minimized.

Now when the input shaft 9 is applied with a certain turning force by the knob (not shown) in a direction to turn core 7 in a clockwise direction in FIG. 3a, the wall 8A of the recess 8 of the core 7 pushes the bent end 5A of the second coil spring 5 in a clockwise direction and at the same time, pushes the bent end 3A of the first coil spring 3 in a clockwise direction through the bent end 5A and the pawl 14. Thus, the diameters of the second and first coil springs 5 and 3 are reduced and thus the braking force generated between each coil spring and the cylindrical inner wall of the housing 1 is reduced permitting rotation of the core 7 within the housing 1, as is seen from FIG. 3b.

When, on the contrary, the output member 12 is applied with a certain turning force from an external device (not shown) in a direction to be turned counterclockwise in FIG. 3a, the pawl 14 pushes, at the slit 14A and the side wall 14B, the bent end 3A of the first coil spring 3 and the bent end 5A of the second coil spring 5 in a counterclockwise direction increasing the diameters of springs 3 and 5. Upon this, coil springs 3 and 5 become strongly pressed against the cylindrical inner wall of housing 1, so that rotation of the output member 12 in such direction is not permitted.

When the input shaft 9 is applied with a certain turning force by the knob (not shown) in a direction to turn core 7 counterclockwise, in FIG. 3a, the wall 8B of the recess 8 of core 7 instantly pushes the bent end 3B of the first coil spring 3 in a counterclockwise direction and thereafter pushes the bent end 5B of the second coil spring 5. Thus, the diameters of the first and second coil springs 3 and 5 are reduced and thus the braking force generated between each coil spring 3 or 5 and the cylindrical inner wall of the housing 1 is reduced permitting rotation of core 7 within the housing 1, as is seen from FIG. 3c.

When, under this condition, manipulation of the knob stops, the core 7 is forced to turn slightly in a clockwise direction, due to a returning force produced by the bent end 3B of the first coil spring 3, to a new rest position wherein the wall 8A of the recess 8 is in contact with the bent end 5A of the second coil spring 5. That is, the transmission device assumes a new condition such as one as illustrated in FIG. 3a.

On the contrary, when the output member 12 is applied with a certain turning force from the external device (not shown) in a direction to be turned clockwise direction, in FIG. 3a, the bent end 3A of the first coil spring 3 is drawn clockwise by the pawl 14 and then the side wall 14C of the pawl 14 pushes the bent end 5B of the second coil spring 5 thereby increasing the diameter of the same. Under this condition, only the second coil spring 5 is strongly pressed against the cylindrical inner wall of the housing 1 for suppressing clockwise rotation of the output member 12.

As will be understood from the above description, application of external force to the core 7 from the input shaft 9 allows rotation of the output member 12, while application of external force to the output member 12 does not induce rotation of the same.

However, the above-mentioned first embodiment has such a drawback that in the case wherein the output member 12 is applied with a force to be turned in a clockwise direction in FIG. 3a, the travelling of the pawl 14 carried out until the pawl 14 comes to contact with the bent end 5B of the second coil spring 5 inevitably induces a play of the output member 12.

Figure 4A:
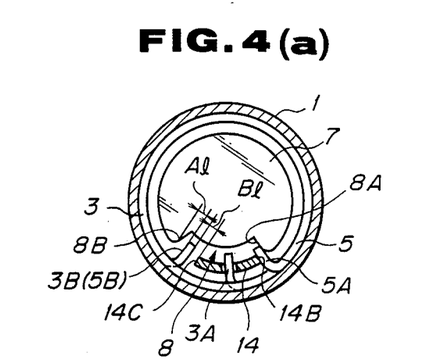
FIGS. 4a, 4b and 4c are views similar to FIGS. 3a to FIG. 3d, but showing a second embodiment of the present invention.
Figure 4B:
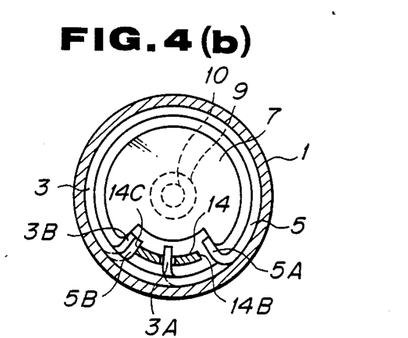
Figure 4C:
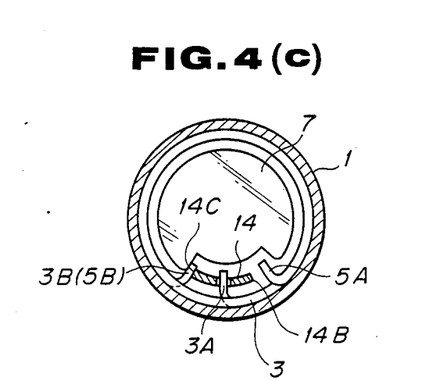

Referring to FIGS. 4a, 4b and 4c, there is shown a second embodiment of the present invention, which can solve the inevitable drawback of the above-mentioned first embodiment.

In this second embodiment, under the rest condition of the device, the bent ends 3B and 5B of the first and second coil springs 3 and 5 are placed at the same position in a space defined between the wall 8B of the recess 8 and the side wall 14C of the pawl 14 as is seen from FIG. 4a. Furthermore, the following equation is satisfied in the second embodiment.

$$Al \geq Bl \ldots\ldots\ldots\ldots \quad (1)$$

wherein:
  Al: distance between the bent end 3B (or 5B) and the wall 8B of the recess 8; and
  Bl: distance between the bent end 3B (or 5B) and the side wall 14C of the pawl 14.

When the output member 12 is applied with a certain turning force from the external device (not shown) in a direction to be turned clockwise in FIG. 4a, pawl 14 is turned together with the bent end 3A of the first coil spring in the same direction by the distance B bringing the side wall 14C thereof into abutment with and thus pressing the bent end 5B of the second coil spring 5. Due to the movement of the bent end 3A drawn by pawl 14, the other end 3B of the first coil spring 3 is brought into contact with the wall 8B of recess 8.

Because the second coil spring 5 is forced to increase its diameter and thus strongly press against the cylindrical inner wall of housing 1, clockwise movement of the output member 12 is suppressed.

It is to be noted that under a practically used condition of the transmission device, the parts of the same assume the conditions as shown in FIG. 4b. Under this condition, the bent end 3B of the first coil spring 3 is located close to the wall 8B of recess 8, so that undesired play of core 7 and thus that of the knob is suppressed or at least minimized.

When, under this condition, the input shaft 9 is applied with a certain turning force by the knob (not shown) in a direction to turn the core 7 counterclockwise direction in FIG. 4b, the first and second coil springs 3 and 5 are forced to reduce their diameters permitting rotation of core 7 within the housing 1, as will be understood from FIG. 4c. The rotation transmission from the input shaft 9 to the output member 12 is also permitted when the input shaft 9 is applied with a certain force in a direction to turn the core 7 clockwise in FIG. 4b.

On the contrary, when the output member 12 is applied with a certain turning force from the external device (not shown) in a direction to be turned counterclockwise in FIG. 4b, the bent end 3A of the first coil spring 3 is instantly drawn by the pawl 14 in a direction to increase the diameter of the same and then the bent end 5A of the second coil spring 5 is pushed by the side wall 14B of the pawl 14 in a direction to increase the diameter of the same. Thus, under this condition, rotation of the core 7 is suppressed.

When the output member 12 is applied with a certain turning force from the external device (not shown) in a direction to be turned clockwise in FIG. 4b, the bent end 5B of the second coil spring 5 is instantly pushed by the side wall 14C of the pawl 14 in a direction to increase the diameter of the same thereby suppressing rotation of the core 7 in the same direction.

Thus, in the second embodiment, application of any turning force to the output member 12 from an external device induces instant stopping of the output member 12 7 relative to the housing 1. Thus, undesired play of the output member 12 is suppressed or at least minimized.

Referring to FIGS. 5, 6, 7a and 7b, there is shown a third embodiment of the present invention, which can solve a drawback which the above-mentioned second embodiment may have.

Figure 8:
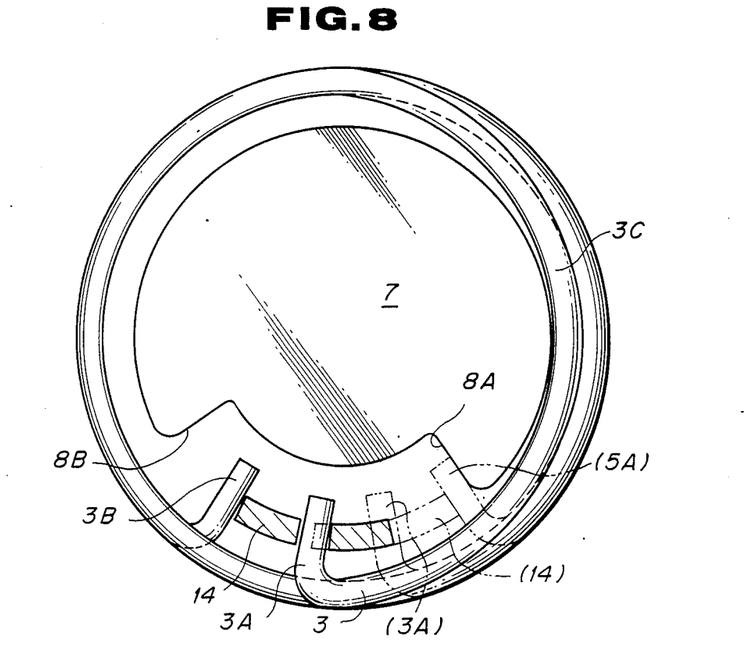
FIG. 8 is a view similar to FIG. 7b, but showing a drawback which the second embodiment may have.

The drawback of the second embodiment will be described with reference to FIGS. 4a and 8.

That is, when the output member 12 is applied with a certain turning force from the external device in a direction to be turned counterclockwise in FIG. 4a, the bent end 3A of the first coil spring 3 is drawn counterclockwise toward pawl 14. Thus, in a normal condition, the movement of the bent end 3A of the first coil spring 3 brings the other bent end 3B of the same to the position near the wall 8B of the recess 8 of the core 7. However, as is seen from FIG. 8, it sometimes occurs that the movement of the bent end 3A by the pawl 14 induces only a flex of a leading part 3C of the coil 3 without bringing the other bent end 3B of the coil 3 to the position of the wall 8B of the recess 8. Of course, this phenomenon prevents the transmission device from exhibiting its optimal braking function.

This drawback is solved by the device of the third embodiment.

Figure 5:
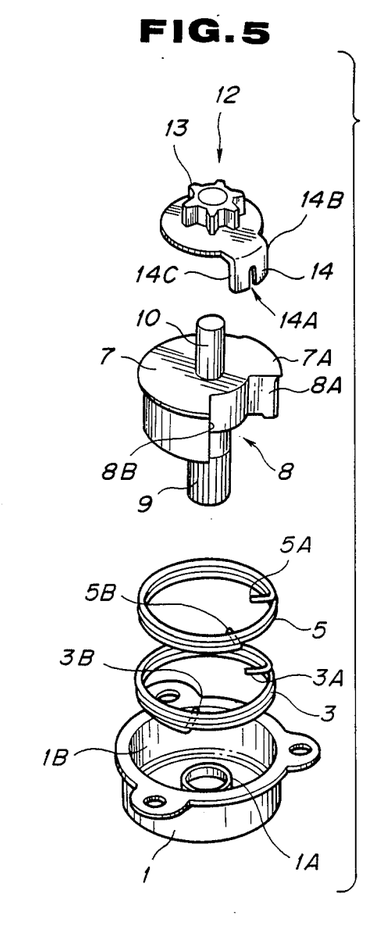
FIG. 5 is a view similar to FIG. 1, but showing a third embodiment of the present invention.
Figure 6:
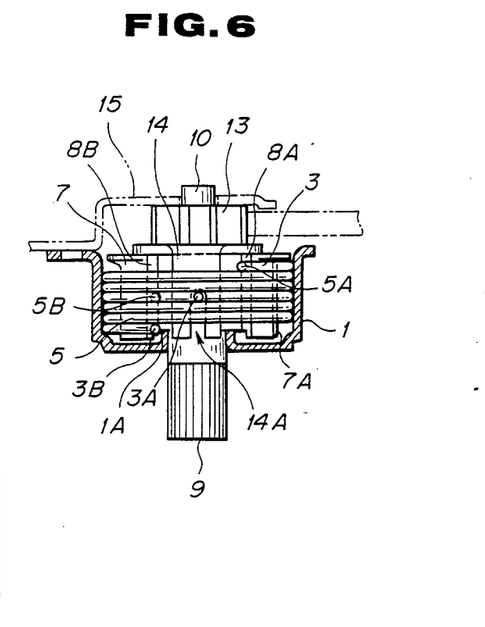
FIG. 6 is a view similar to FIG. 2, but showing the third embodiment.

That is, in the third embodiment, there is integrally formed a raised portion 7A on the cylindrical outer wall of the core 7 near the wall 8A, as is best seen from FIG. 5. Due to provision of the raised portion 7A, the above-mentioned flex of the leading part of the first coil spring 3 does not occur, so that the movement of the bent end 3A by the pawl 14 assuredly brings the other bent end 3B of the coil spring 3 to the position near the wall 8B.

Figure 9:
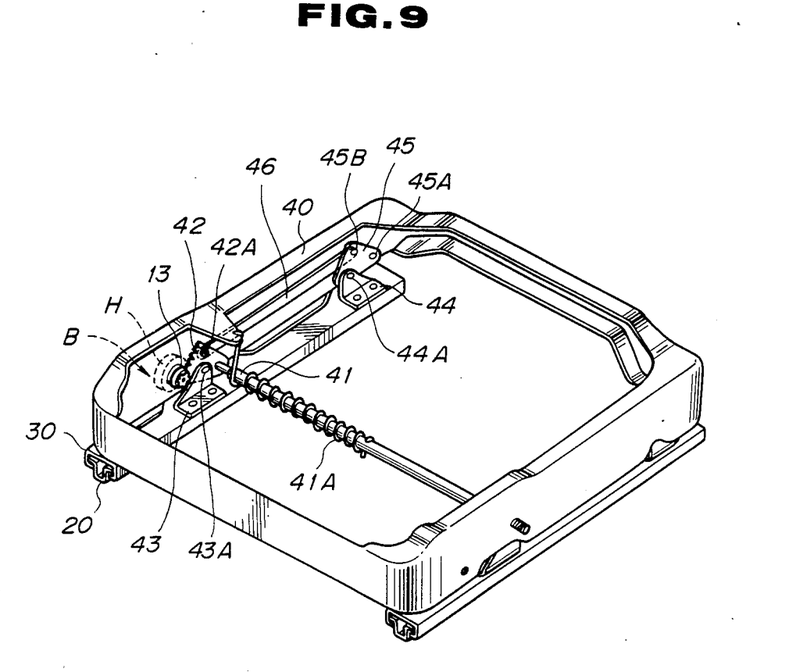
FIG. 9 a perspective view of a seat height position adjuster to which the one-way transmission device of the present invention is practically applied.

Referring to FIG. 9, there is shown a seat height position adjuster to which the third embodiment of the present invention is practically applied.

In the drawing, numeral 20 denotes a lower rail secured to a vehicle floor, 30 is an upper rail slidably mounted on the lower rail 20, and 40 is a rectangular seat frame connected to the upper rail 30 through a height position adjuster.

The height position adjuster comprises a shaft 41 which is pivotally supported by the seat frame 40. A sector gear 42 is secured to the shaft 41 to move therewith.

First and second supporting brackets 43 and 44 are secured to the upper rail 30. The first supporting bracket 43 has the sector gear 42 pivotally connected thereto via a pin 43A. The second supporting bracket 44 has an intermediate bracket 45 pivotally connected thereto via a pin 44A. The intermediate bracket 45 is pivotally connected to the frame 40 through a pin 45A. The sector gear 42 and the intermediate bracket 45 are pivotally connected through a rod 46 through respective pins 42A and 45B.

A spiral spring 41A is disposed about the shaft 41 having one end secured to the shaft 41 and the other end hooked to the frame 40, so that the shaft 41 and thus the sector gear 42 is biased about the pivot pin 43A in a counterclockwise direction in FIG. 9.

The one-way transmission device of the third embodiment is mounted to the seat frame 40. That is, the housing 1 of the device is secured to the seat frame 40 having the pinion 12 of the output member 12 meshed with the sector gear 42. Designated by reference "H" is a knob which is connected to the input shaft 9 of the device.

Figure 7A:
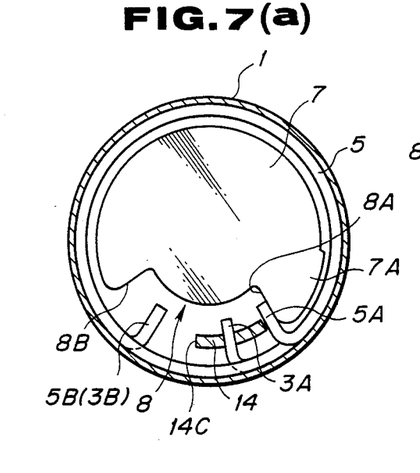
FIGS. 7a and 7b are views similar to FIGS. 3a to 3d, but showing conditions of the third embodiment.
Figure 7B:
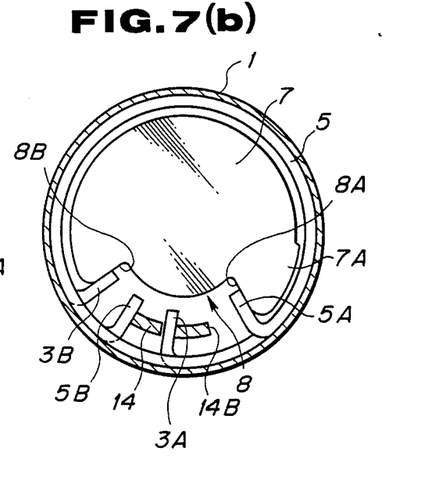

When the transmission device in the condition of FIG. 7a is properly mounted to the seat frame 40, the pinion 13 of the device is urged to turn in a clockwise direction in FIG. 9 in response to a counterclockwise pivoting of the sector gear 42 about the pin 43A due to the function of the spring 41A. With this, the output member 12 and thus the pawl 14 is turned in a clockwise direction together with the first coil spring 3 to a position where the side wall 14C of the pawl 14 is in contact with the bent end 5B of the second coil spring 5, as is shown in FIG. 7b. It is to be noted that because of the reason which has been mentioned hereinabove, the other bent end 3B of the first coil spring 3 comes close to the wall 8B of the recess 8 of the core 7. Thus, undesired play of the core 7 and thus the knob "H" is thus suppressed or at least minimized.

When, under this condition, a certain load is applied to the seat frame 40 due to sitting of a person thereon, that is, when, with the transmission device assuming the condition of FIG. 7b, the output member 12 is applied with a certain turning force in a direction to be turned counterclockwise in FIG. 7b, the first coil spring 3 instantly increases its diameter, braking the movement of the output member 12 and then the second coil spring 5 increases its diameter assuring the braking for the reason which has been described hereinabove. Thus, under this condition, the pinion 13 becomes immobilized and thus the load applied to the seat frame 40 is assuredly received by the seat height position adjuster without lowering the seat frame 40 relative to the rails 20 and 30.

On the contrary, when due to vibration of the vehicle, the seat frame 40 is applied with a negative load, that is, when, with the transmission device assuming the condition of FIG. 7b, the output member 12 is applied with a certain turning force in a direction to be turned clockwise in FIG. 7b, the second coil spring 5 instantly increases its diameter braking the movement of the output member 12. Thus, under this condition, the pinion 13 becomes immobilized and thus the negative load applied to the seat frame 40 is assuredly received by the position adjuster without raising the seat frame 40 relative to the rails 20 and 30.

For the reasons which have been described hereinabove, the movement transmission from the knob "H" to the output member 12, viz., to the position adjuster is permitted. Thus, the height position of the seat is easily achieved by manipulating the knob.

What is claimed is:

1. A one-way transmission device comprising:
   a housing having a cylindrical inner wall formed therein;
   a first coil spring coaxially receiving in said housing and resiliently pressed at its outer periphery against said cylindrical inner wall, said first coil spring having first and second ends which are bent radially inwardly;
   a second coil spring coaxially received in said housing beside said first coil spring, said second coil spring being pressed at its outer periphery against said cylindrical inner wall, said second coil spring having first and second ends which are bent radially inwardly;
   an annular core coaxially and rotatably received in the coaxially arranged first and second coil springs and having at a peripheral portion thereof a sectoral recess into which said first and second ends of said first and second coil springs are received, said sectoral recess being defined by circularly spaced first and second walls;
   input and output shafts respectively connected to axially opposed sides of said annular core to rotate therewith;
   an output member including a base portion having a bore through which said output shaft passes and a pawl projecting into said sectoral recess, said pawl having a slit with which said first end of said first coil spring is engaged; and
   said first end of said second coil spring is arranged between said first wall of said sectoral recess and said pawl, and in which said second ends of said first and second coil springs are each arranged between said second wall of said sectoral recess and said pawl.

2. A one-way transmission device as claimed in claim 1, in which said annular core is provided with a structure which assures movement of said second end of said first coil spring toward said second wall of said sectoral recess when said first end of said first coil spring is brought toward said second wall of said recess by said pawl upon slight rotation of said output member in a given direction.

3. A one-way transmission device as claimed in claim 2, in which said structure is a raised portion formed on a cylindrical outer surface of said annular core near said first wall of said sectoral recess.

4. A one-way transmission device as claimed in claim 2, in which said first and second coil springs are so sized and constructed that when said pawl assumes a given position wherein said first end of said second coil spring is intimately put between said pawl and the first wall of said sectoral recess, the distance between said second end of said first coil spring and the second wall of said sectoral recess is smaller than that between said second end of said second coil spring and the second wall of said sectoral recess.

5. A one-way transmission device as claimed in claim 4, in which when said pawl assumes said given position, said second end of said first coil spring is located in the vicinity of the second wall of said sectoral recess.

6. A one-way transmission device as claimed in claim 2, in which said first and second coil springs are so sized and constructed that when said pawl assumes a given position wherein said first end of said second coil spring is intimately put between said pawl and the first wall of said sectoral recess, said second ends of said first and second coil springs are located at the same position of a space defined between said second wall and said pawl.

7. A one-way transmission device as claimed in claim 6, in which the distance between said the same position and said second wall is equal to or greater than the distance between said the same position to said pawl.

8. A one-way transmission device as claimed in claim 1, in which said housing is formed with a bottom which has a bearing boss through which said input shaft passes.

9. A one-way transmission device as claimed in claim 8, in which said base portion of said output member is equipped with a pinion.

* * * * *